July 3, 1962

E. V. CRANE 3,042,166

FLUID TORQUE LIMITER

Filed Sept. 22, 1958

INVENTOR.
EDWARD V. CRANE
BY
Williams & Tilberry
ATTORNEYS

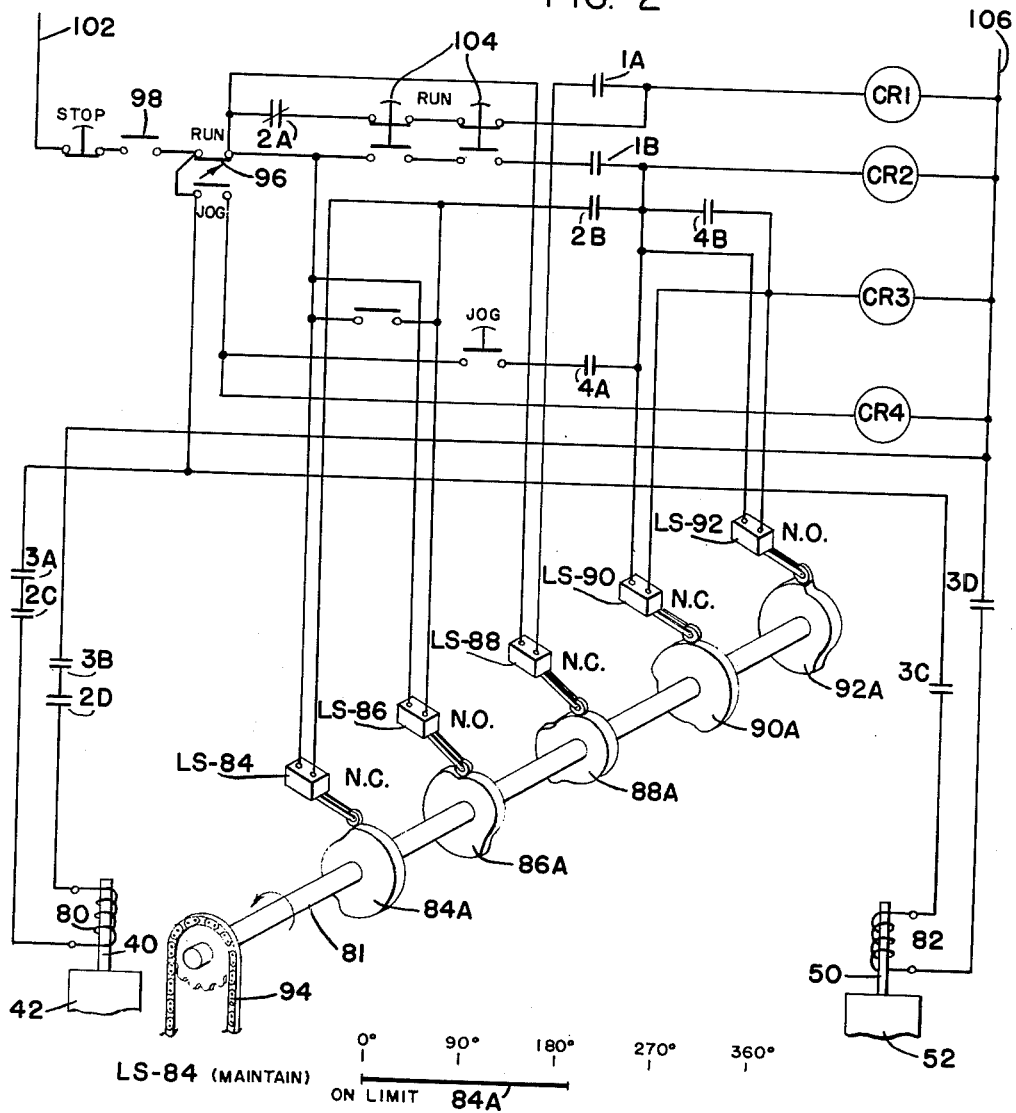

ized July 3, 1962

3,042,166
FLUID TORQUE LIMITER
Edward V. Crane, Canton, Ohio, assignor to E. W. Bliss Company, Canton, Ohio, a corporation
Filed Sept. 22, 1958, Ser. No. 762,649
4 Claims. (Cl. 192—85)

This invention relates to a torque control mechanism associated with machinery such as crank driven power presses and the like to limit maximum values of tonnage in the press stroke, and refers, in particular, to fluid pressure torque control mechanisms associated with clutches of the friction-plate variety.

Problems associated with overload control and torque control devices are set forth and discussed in detail in the United States Patent No. 2,644,563, issued to L. R. Crary, and co-pending patent applications Serial No. 539,366, now Patent No. 2,911,080, granted November 3, 1959, and Serial No. 546,155, now abandoned, all of which are assigned to my assignee of the present invention. The disclosure and discussions set forth in the above identified patent and patent applications are incorporated in this application by reference.

Briefly restated, in order to protect a press from serious overload conditions in a manner which will not interfere with efficient operation, it has been conceived to transmit an approximately constant value of torque to the crankshaft that will produce rated value of press tonnage for positions relatively high in the stroke, and thereafter a progressively diminishing value of torque which will continue to produce but not exceed rated value of press tonnage until the crank reaches the bottom of its stroke. With this concept, at no time is any element of a press overloaded beyond its rated capacity, and yet at the same time all elements are efficiently utilized up to their rated capacity.

Generally speaking, one method for achieving this tonnage torque relationship is to bleed the fluid from the press clutch, whether it be liquid or air, in a controlled manner so that the clutch will transmit a torque proportionate to the pressure in the clutch actuating cylinder. Under ideal conditions, a very good approximation of the rate of pressure reduction required in the clutch cylinder can be obtained by connecting the cylinder to an exhaust orifice of fixed cross sectional area which permits air to bleed from the clutch cylinder at a controlled rate. However, as the clutch linings wear, the volume of air in the clutch actuating cylinder increases relatively thereto, and in cases of considerable wear the volume of the clutch actuating cylinder may increase many times the original volume of the cylinder when the clutch linings were new. It becomes apparent then that an orifice of fixed area cannot unload the pressure directly from a clutch according to any pre-determined pattern if the volume of the chamber which contains the air to be unloaded is an increasing variable. Otherwise stated, as the clutch continues to wear with use, the volume of the air in the clutch increases proportionately and requires that proportionate additional time to be exhausted therefrom.

It is my conception to provide, in association with a fluid actuated clutch cylinder of a press, an exhaust pilot valve having a pilot chamber of substantially fixed volume which, when closed, is subjected to the same pressure as the clutch cylinder. Intermediate the pilot valve and the clutch cylinder I place a valve piston arranged to provide a means for exhausting the pressure from the clutch cylinder. The valve piston is free floating in its own cylinder, and is responsive to the pressures of the clutch cylinder and the pilot valve cylinder. By opening the pilot valve the pressure on the valve piston adjacent the pilot valve side will lessen sufficiently to permit the pressure from the clutch cylinder to force the piston from its seat and to proportionately open an exhaust port to permit pressure to bleed from the clutch cylinder until the pressures substantially equalize. The rate at which the exhaust cylinder will be unloaded is therefore directly dependent on the period of time required to exhaust the pilot chamber pressure. It will then be apparent that with this arrangement the time required to unload the clutch cylinder will be a direct function of the time required to unload the pilot valve cylinder, and this time is substantially a constant. Thus, the variable factors involved in clutch wear do not affect the time required to unload the pressure from the press clutch cylinder.

It is therefore the primary object of my invention to provide a fluid torque limiter mechanism adapted to control the torque transmission of a fluid clutch according to a predetermined pattern throughout the cycle of operation of the clutch irrespective of the wear of the clutch linings. The torque control pattern will remain constant whether the clutch linings are new or old, and whether the volume of air contained in the clutch cylinder is constant, or variable.

The features of my invention which I believe to be novel are set forth with particularity in the appended claims. The invention itself, however, both as to its organization and use, together with further objects and advantages thereof, may best be understood by reference to the following description taken in conjunction with the accompanying drawings in which:

FIGURE 2 is a schematic diagram of the limit switch means for actuating the invention; and, FIGURE 3 is a timing chart illustrating one preferred method of synchronizing the various components of the preferred embodiment of the invention shown in FIGURES 1 and 2.

Figure 1:
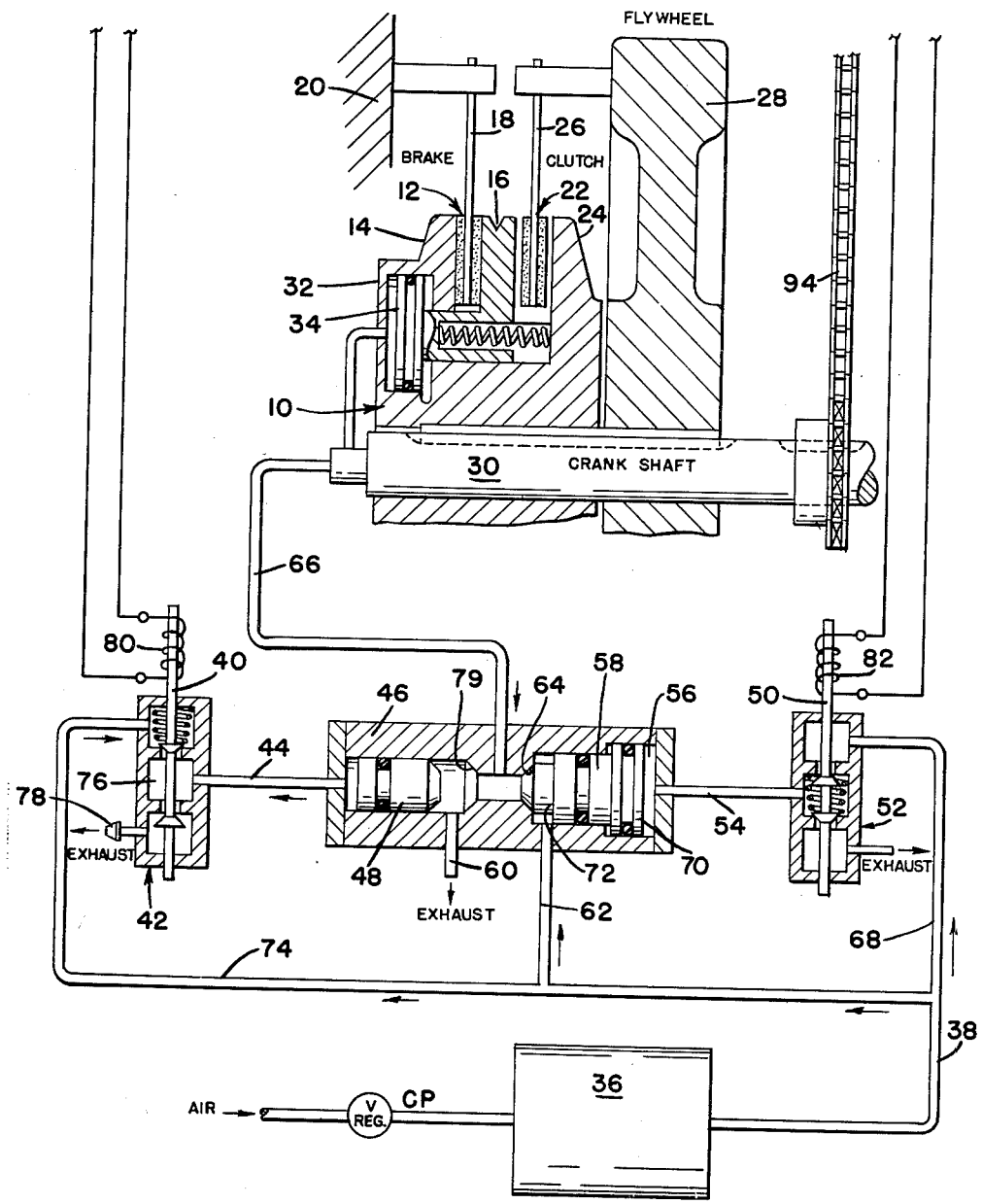
FIGURE 1 is a schematic diagram of a preferred embodiment of my invention with parts in section to more clearly disclose the features of the invention.

Referring now to FIGURE 1 in greater detail, a clutch and brake combination 10 such as commonly employed in the press industry is schematically shown in a sectioned fragmentary manner, and comprises a brake portion 12 having a fixed member 14 and slidable member 16 adapted to engage therebetween a frame reference member 18 secured against rotation to the frame 20 of the press. The clutch member 22 comprises a fixed member 24 adapted to co-act with sliding member 16 to engage a flywheel reference member 26 secured for rotation with the flywheel 28. The slidable member 16 is normally spring-urged into contact with the frame reference member 18 to brake the crankshaft 30 and hold it in a stationary condition. A pneumatic cylinder 32 and piston 34 are adapted to urge the intermediate member 16 out of engagement with the brake frame reference member 26. All of the brake and clutch members referred to hereinabove are suitably lined with friction plates to provide adequate gripping relationship one member with another to transmit torque or to brake the crankshaft against rotation, all of which is standard practice and is well understood by those skilled in the art.

A source of fluid pressure is provided the cylinder 32 by means of a pressure tank 36. It is to be understood that although for purposes of illustration a pneumatic system is shown, the system will function equally well with a liquid source of pressure. The only difference in the two systems would be that in the hydraulic system the exhaust means would be connected in a closed system for return to the pressure tank. Otherwise, in the pneumatic system the exhaust means would be connected to atmosphere.

The path of fluid pressure from the fluid pressure tank 36 to the clutch cylinder 32 will now be described. Pressure from reservoir 36 is admitted into line 38, valve stem 40 of solenoid-operated pilot valve 42 is shifted to admit pressure through line 44 into chamber 46 of free floating valve piston 48, and valve stem 50 of solenoid-operated valve 52 is thereafter shifted to prevent pressure from entering line 54 and to release pressure from chamber 56 of free floating valve piston 58. Valve piston 48 will thus be seated to seal exhaust port 60, and free floating valve 58 will be unseated via pressure through line 62 to permit pressure past valve seat 64 into line 66, and consequently into clutch cylinder 32.

To exhaust air from clutch cylinder 32, the valve stem 50 of solenoid-operated valve 52 is shifted to admit pressure from line 68 into line 54 thereby shifting free floating valve piston 58 onto its seat 64. It will be apparent that the greater area of the right end 70 of free floating valve piston 58 in combination with the pressure from line 54 will overcome the pressure from line 62 applied to the lesser area 72 at the left end of the valve piston. With the source of pressure cut off from the clutch cylinder 32 by the seating of valve piston 58, the valve stem 40 of solenoid-operated pilot valve 42 is shifted to cut off the pressure from line 74 connected to pressure tank 36, and to open to atmosphere, in the case of a pneumatic arrangement, pressure from cylinder 32 and pilot valve cylinder 76. It is a condition of this invention that the substantially constant volume of pilot cylinder 76 relative to a selected cross sectional area of the exhaust orifice 78 results in a controlled rate of pressure drop back of valve 48.

Thus, as the pressure reduces in pilot valve cylinder 76 at a controlled rate, a tendency develops to maintain a balance of pressure at opposite ends of free floating valve piston 48. As the pressure on the left side of valve piston 48 lessens, the pressure from clutch cylinder 32 forces the valve piston from its seat 79 to exhaust air through exhaust port 60. It will be apparent, therefore, that the rate of discharge of pressure from the clutch cylinder 32 is a direct function of the controlled rate of discharge of pressure from the pilot valve cylinder 76, and that when the pilot cylinder 76 is completely discharged the clutch cylinder 32 of necessity must also be completely discharged. In order for the device to operate satisfactorily, exhaust port 60, of course, must be sufficiently large to prevent any back pressure at this point in the system. Thus, by maintaining a delicate balance between pressures on the opposite sides of valve piston 48, accurate control is maintained of the pressure reduction in clutch cylinder 32 proportionate to the controlled rate of reduction of pressure from pilot cylinder 76, and substantially independent of clutch wear and consequent change of the volume to be discharged from cylinder 32.

Reference will now be made to FIGURES 2 and 3 wherein are shown schematic diagrams of the switch means employed to operate the solenoid-operated valves 42 and 52, having solenoid coils 80 and 82 respectively. Also schematically shown are the rotatably adjustable timing cams which actuate the necessary limit switches 84, 86, 88, 90, and 92. The timing cams 84A, 86A, 88A, 90A, and 92A are fixed to camshaft 81 which is in turn driven from the press crankshaft 30 (see FIGURE 1) by means of chain 94. Prior to starting a press cycle, solenoid-operated valves 42 and 52 are de-energized, and fluid from lines 68 and 54 maintains valve piston 58 seated on valve seat 64. Pilot cylinder 76 and line 44 are open to atmosphere through exhaust orifice 78, and clutch cylinder 32 is open to atmosphere through line 66, and exhaust port 60.

To start a normal press cycle, selector switch 96 must be in "run" position, and switch 98 closed. Control relay CR1 is immediately energized, from line 102, starting switch 98, selector switch 96, normally closed contact 2A, "run" buttons 104, relay CR1, and line 106. Relay CR1 is then maintained energized through normally closed limit switch 88, and normally open contact 1A which is now closed. When the "run" buttons 104 are depressed, control relay CR2 will be energized through closed contact 1B. Limit switch 84, closed by its cam 84A from the start of the cycle, maintains relay CR2 closed through closed contact 2B. Since limit-switch 90 is closed by its cam 90A, relay CR3 is immediately energized. With both relays CR2 and CR3 energized, contacts 3A, 2C, 2D, and 3B close and solenoid coil 80 is energized. Contacts 3C and 3D also close, and solenoid coil 82 is energized.

Fluid pressure will thus flow from reservoir 36, through line 38, line 62, past valve seat 64, through line 66, and into clutch cylinder 32. The flywheel 28 is thus engaged through clutch members 16, 22, and 24, and the press cycle starts. As the work piece is approached, limit switch 90 is opened by its cam 90A, de-energizing relay CR3 immediately. Normally open contacts 3A, 3B, 3C, and 3D open, and solenoid coils 80 and 90 are both de-energized. Valve piston 58 will move onto seat 64 as previously described, and pressure from clutch cylinder 32 will start to unseat valve piston 48 from seat 78. The movement of valve piston 48 will be impeded, and thereby controlled, by the rate of exhaust from orifice 78. The rate of exhaust thus controls the rate of clutch pressure reduction, and consequent torque reduction, in a predetermined manner.

Just prior to the bottom of the stroke of the press, limit switch 92 is closed, and relay CR3 is again energized. At approximately the same time, limit switch 86 is closed, and being in parallel with limit switch 84, provides a factor of safety, in that should either switch 84 or 86 fail at this time, the remaining switch would insure full pressure on the clutch cylinder 32, and thereby rated capacity on the workpiece. Limit switch 92 keeps solenoid coils 80 and 90 energized until limit switch 86 is opened toward the end of the cycle. Thereafter, solenoid coils 80 and 82 are both de-energized for the remainder of the cycle.

Shortly after the press starts on its return stroke, normally closed limit switch 88 is opened, relay CR1 is de-energized opening contacts 1A and 1B. This insures that, if the run buttons are not released by this time, the press will not repeat a cycle until they are released, and then depressed again. Limit switch 88 is again closed prior to the end of the cycle.

It is to be understood that while only one embodiment of the invention is shown herein, this embodiment is by way of example only and is not to be construed in a limiting sense. Other arrangements and modifications will occur to those skilled in the art upon reading the specification and the attached claims, and may be resorted to without departing from the scope of the invention.

I claim:

1. In combination with fluid pressure operable clutch means having friction linings subject to depletion through use, and including a clutch fluid pressure cylinder having a piston to urge said linings into pressure contact one with the other to transmit torque, wherein the volume of said cylinder increases in proportion to the depletion of said linings, the improvement in torque control means comprising: fluid pressure exhaust means connected to said cylinder; valve means interposed between said exhaust means and said cylinder; a chamber in said valve means; a valve piston in said chamber adapted by movement in said chamber to control the flow of fluid from said cylinder through said exhaust means; a second valve means having a pilot chamber therein of constant volume; fluid pressure connecting means between said pilot chamber and said first mentioned chamber; means to provide fluid pressure in said pilot chamber and said connecting means to urge said valve piston into a closed position with respect to said exhaust means; and means to exhaust the fluid pressure from said pilot chamber at a controlled rate, whereby the pressure from said clutch cylinder will move said valve piston into a partially open position, and whereby the rate of pressure drop in said clutch cylinder is a function of the controlled rate of pressure drop in said constant volume pilot chamber.

2. In combination with a fluid pressure operable friction clutch having friction linings subject to depletion through use, the improvement in a torque control mechanism adapted to vary torque according to a predetermined pattern irrespective of friction lining depletion, comprising: a source of fluid pressure; means to operably connect said source of fluid pressure to said clutch; an exhaust valve including a valve chamber with a pair of ports, one remote from the other; a pressure responsive piston shiftable within said valve chamber between said ports; pressure connecting means between said clutch and one of said ports of said valve; a second valve including a pilot chamber therein of constant volume; means to connect said pilot chamber to the other of said ports; means to connect said source of fluid pressure to said pilot chamber; and means to exhaust fluid from said pilot chamber, whereby upon the exhausting of fluid from said pilot chamber said pressure responsive piston will shift proportionate to the decrease of pressure in said pilot chamber to open one of said ports to provide a rate of pressure drop in said clutch proportionate to the controlled rate of pressure drop in said constant volume pilot chamber.

3. In a torque control mechanism adapted to reduce the fluid pressure applied to the fluid cylinder of a fluid operable friction drive clutch at a predetermined rate irrespective of clutch lining wear, the improvement comprising: a pilot valve having a pilot chamber therein of constant volume adapted to exhaust fluid at a constant rate; exhaust valve means including a master chamber; a piston shiftable within said master chamber; a valve seat at one end of said master chamber connectable to the fluid cylinder of said clutch; fluid exhaust port means in said chamber positioned to be closed when said piston is seated; means to transmit pressure from said pilot chamber to said piston to seat said valve; and means to release pressure in said pilot chamber at a controlled rate whereby said piston is unseated an amount sufficient to exhaust said clutch cylinder at a rate proportional to the rate of pressure release in said pilot constant volume chamber.

4. In combination with a fluid pressure operable friction clutch having a lining subject to depletion through use, and a fluid pressure clutch cylinder having a piston therein adapted to urge said linings into contact one with the other to transmit torque, the volume of said cylinder increasing proportionate to the wear of said linings, the improvement in torque control means comprising: pressure differential operable valve means; pilot valve means having a pilot chamber therein of constant volume; means to connect one side of said first mentioned valve means to said clutch cylinder; means to connect the other side of said valve means to the chamber of said pilot valve means; means to supply pressure to the chamber of said pilot valve means; means to provide a timed and an orifice controlled rate of pressure reduction in said pilot valve chamber; and means to open said pilot valve means to exhaust pressure from said pilot chamber, whereby the rate of pressure release from said clutch cylinder is a function of the operation of the differential operable valve means acting responsive to the pressure decrease in said pilot chamber.

References Cited in the file of this patent
UNITED STATES PATENTS

| | | |
|---|---|---|
| 2,214,201 | Moulder | Sept. 10, 1940 |
| 2,396,231 | Brill | Mar. 12, 1946 |
| 2,734,609 | Fritzsch | Feb. 14, 1956 |
| 2,854,115 | Friedman | Sept. 30, 1958 |

UNITED STATES PATENT OFFICE

CERTIFICATE OF CORRECTION

Patent No. 3,042,166                                July 3, 1962

Edward V. Crane

It is hereby certified that error appears in the above numbered patent requiring correction and that the said Letters Patent should read as corrected below.

Column 2, line 53, before "26." insert -- 18 and into engagement with the clutch flywheel reference member --.

Signed and sealed this 30th day of October 1962.

(SEAL)
Attest:

ERNEST W. SWIDER
Attesting Officer

DAVID L. LADD
Commissioner of Patents